US005728423A

United States Patent [19]
Rogerson

[11] Patent Number: 5,728,423
[45] Date of Patent: Mar. 17, 1998

[54] METHOD AND APPARATUS FOR INTERNALLY AND EXTERNALLY COATING ENCLOSED METALLIC STRUCTURES

[76] Inventor: L. Keith Rogerson, No. 9 Fourth Ave., Isle of Palms, S.C. 29451

[21] Appl. No.: 410,802

[22] Filed: Mar. 27, 1995

[51] Int. Cl.$^6$ ..................................................... B05D 7/22
[52] U.S. Cl. ..................... 427/231; 427/183; 427/189; 427/234; 427/239; 427/385.5; 427/388.1; 427/398.2
[58] Field of Search .................................... 427/231, 234, 427/239, 314, 318, 385.5, 388.1, 183, 189, 202

[56] References Cited

U.S. PATENT DOCUMENTS

| | | |
|---|---|---|
| 1,377,592 | 5/1921 | Kuhlemeier et al. . |
| 1,954,904 | 12/1934 | Walter . |
| 2,125,912 | 8/1938 | George et al. . |
| 2,914,169 | 11/1959 | Moore . |
| 3,207,358 | 9/1965 | Fliss . |
| 3,275,798 | 9/1966 | Martin . |
| 3,350,745 | 11/1967 | Schott et al. . |
| 3,436,324 | 4/1969 | Hass et al. . |
| 3,574,245 | 4/1971 | Dohm . |
| 3,594,862 | 7/1971 | Seefluth . |
| 3,609,814 | 10/1971 | Vox et al. . |
| 3,745,035 | 7/1973 | Troughton et al. . |
| 3,799,729 | 3/1974 | Hagen . |
| 3,802,847 | 4/1974 | Hara et al. . |
| 3,829,272 | 8/1974 | Carillon et al. . |
| 3,841,557 | 10/1974 | Atkinson . |
| 3,896,963 | 7/1975 | Schisler . |
| 3,907,482 | 9/1975 | Shiota et al. . |
| 3,914,361 | 10/1975 | Shiina et al. . |
| 3,914,521 | 10/1975 | Beatty et al. . |

(List continued on next page.)

OTHER PUBLICATIONS

Duron Self–Cleaning Water Heaters Brochure (No Date).
William K. Neidinger, "A Molder Views the State of Rotocasting Art," SPE Journal, Apr. 1971, vol. 27, pp. 63–66.
J. Arnold Nickerson, "Rotational Molding," 1970–1971 Modern Plastics Encyclopedia, pp. 600–602 (No Mo.).
BP Product Bulletin, Polybond 1000, 1001, 1002, and 1003 (No Date).
BP Technical Notes, Polybond, Grades Used as Additives in Filled Compounds (No Date).
BP Technical Notes, Polybond, Grades Used for Adhesion to Metals and Polar Polymers (No Date).
BP Chemicals, Material Safety Data Sheet, Polybond 1001 (No Date).
BP Product Bulletin, Polybond 2021 (No Date).
BP Product Bulletin, Polybond 1016 (No Date).
Quantum Data Sheet, Plexar, Metal Bonding and Coating Resin (No Date).
USI Brochure, Plexar, Adhesive Resins (No Date).
Plastic Flamecoat Systems, Inc. Brochure, Portable Thermoplastic Spraying (No Date).
BP Chemicals Brochure, BP Peformance Polymers, Inc., Polybond (No Date).
USI, Petrothene, Polyolefins . . . a processing guide (No Date).

*Primary Examiner*—Janyce Bell
*Attorney, Agent, or Firm*—Dority & Manning, P.A.

[57] ABSTRACT

A process and apparatus for internally and externally coating enclosed structures with polymeric materials are provided. In general, the process includes loading a polymeric material into the interior of an enclosed structure. The enclosed structure is then heated and rotated until a polymeric lining is formed within the structure. A second coat of polymeric material may be applied to the exterior surface of the enclosed structure while the enclosed structure is at a temperature sufficient to melt the polymeric material. The enclosed structure can include tanks, drums, barrels, pipes, and the like. In one embodiment, an apparatus having a plurality of arms is used to rotate the enclosed structures between stations corresponding to different steps in the process. The apparatus can include a cooling system for cooling the arms during operation.

22 Claims, 9 Drawing Sheets

U.S. PATENT DOCUMENTS

| | | | |
|---|---|---|---|
| 3,974,306 | 8/1976 | Inamura et al. | 427/231 |
| 3,989,787 | 11/1976 | Scott, Jr. et al. . | |
| 3,989,859 | 11/1976 | Koerper | 427/183 |
| 3,997,649 | 12/1976 | Pivar . | |
| 4,017,934 | 4/1977 | Callahan . | |
| 4,039,703 | 8/1977 | Kamijo et al. | 427/183 |
| 4,167,382 | 9/1979 | Freedman et al. . | |
| 4,263,879 | 4/1981 | Lindahl . | |
| 4,285,334 | 8/1981 | Collins . | |
| 4,285,903 | 8/1981 | Lemelson . | |
| 4,315,725 | 2/1982 | Yoshino . | |
| 4,408,689 | 10/1983 | Daniels . | |
| 4,447,377 | 5/1984 | Denton . | |
| 4,472,231 | 9/1984 | Jenkins . | |
| 4,505,231 | 3/1985 | Syler . | |
| 4,512,289 | 4/1985 | Collins . | |
| 4,527,543 | 7/1985 | Denton . | |
| 4,529,869 | 7/1985 | Ekstrom, Jr. . | |
| 4,548,779 | 10/1985 | Steinberg et al. . | |
| 4,555,379 | 11/1985 | Maringer et al. . | |
| 4,587,318 | 5/1986 | Inoue et al. . | |
| 4,664,958 | 5/1987 | Jones . | |
| 4,682,797 | 7/1987 | Hildner . | |
| 4,722,678 | 2/1988 | Wersosky . | |
| 4,729,862 | 3/1988 | Salatiello et al. . | |
| 4,755,333 | 7/1988 | Gray . | |
| 4,783,896 | 11/1988 | Stubbe et al. . | |
| 4,791,888 | 12/1988 | Vago . | |
| 4,808,364 | 2/1989 | Blunt et al. . | |
| 4,836,963 | 6/1989 | Gilman, Jr. . | |
| 4,838,211 | 6/1989 | Vago . | |
| 4,889,105 | 12/1989 | Vago et al. . | |
| 4,957,097 | 9/1990 | Chevalier et al. . | |
| 5,094,607 | 3/1992 | Masters . | |
| 5,094,608 | 3/1992 | Piazza et al. . | |
| 5,096,775 | 3/1992 | Sato et al. . | |
| 5,102,956 | 4/1992 | Holmes-Farley . | |
| 5,205,895 | 4/1993 | Hohman, Jr. et al. . | |
| 5,217,140 | 6/1993 | Lindahl . | |
| 5,221,539 | 6/1993 | Pallerberg et al. . | |
| 5,316,810 | 5/1994 | Rogerson . | |
| 5,358,682 | 10/1994 | Rogerson . | |

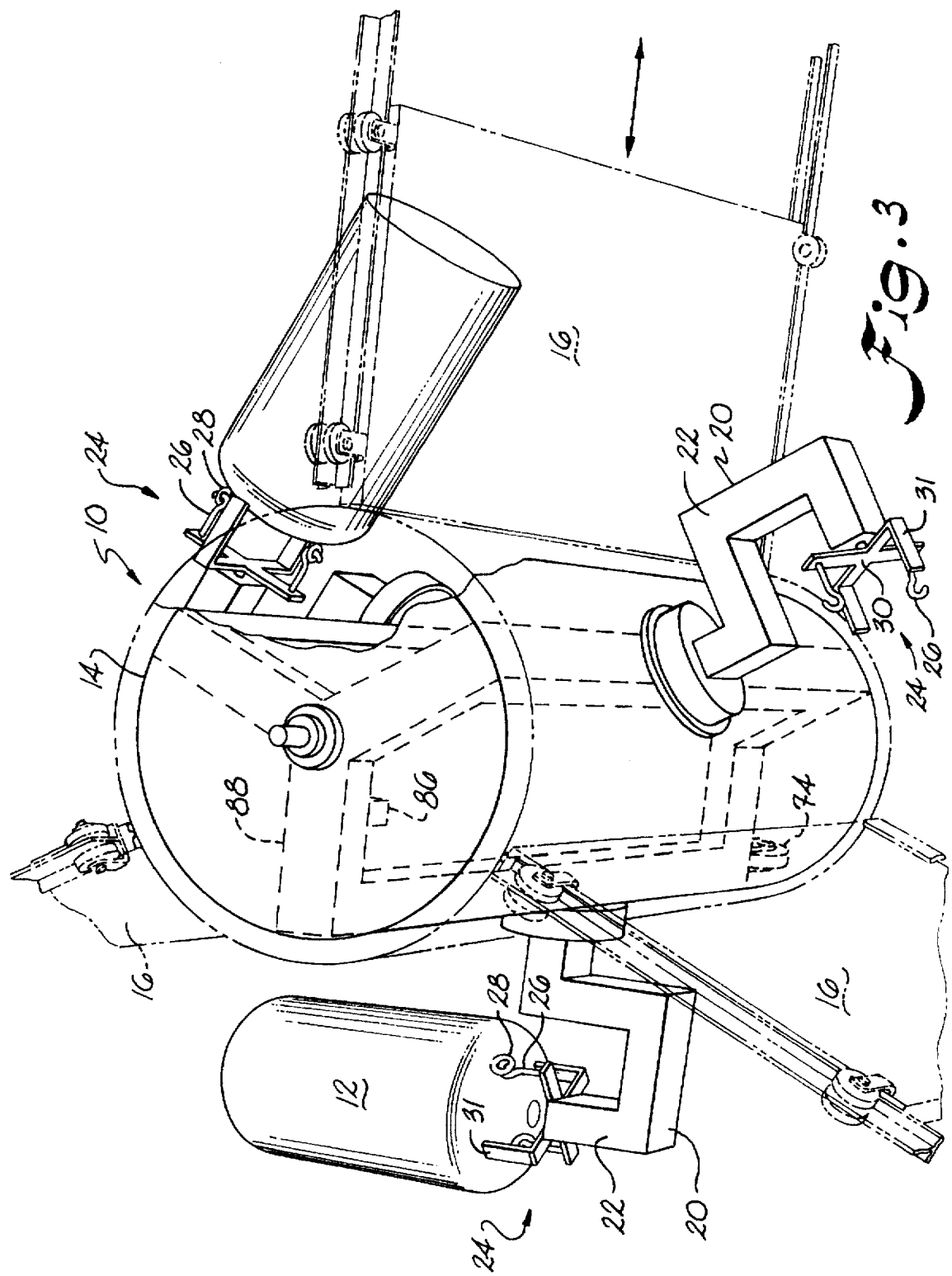

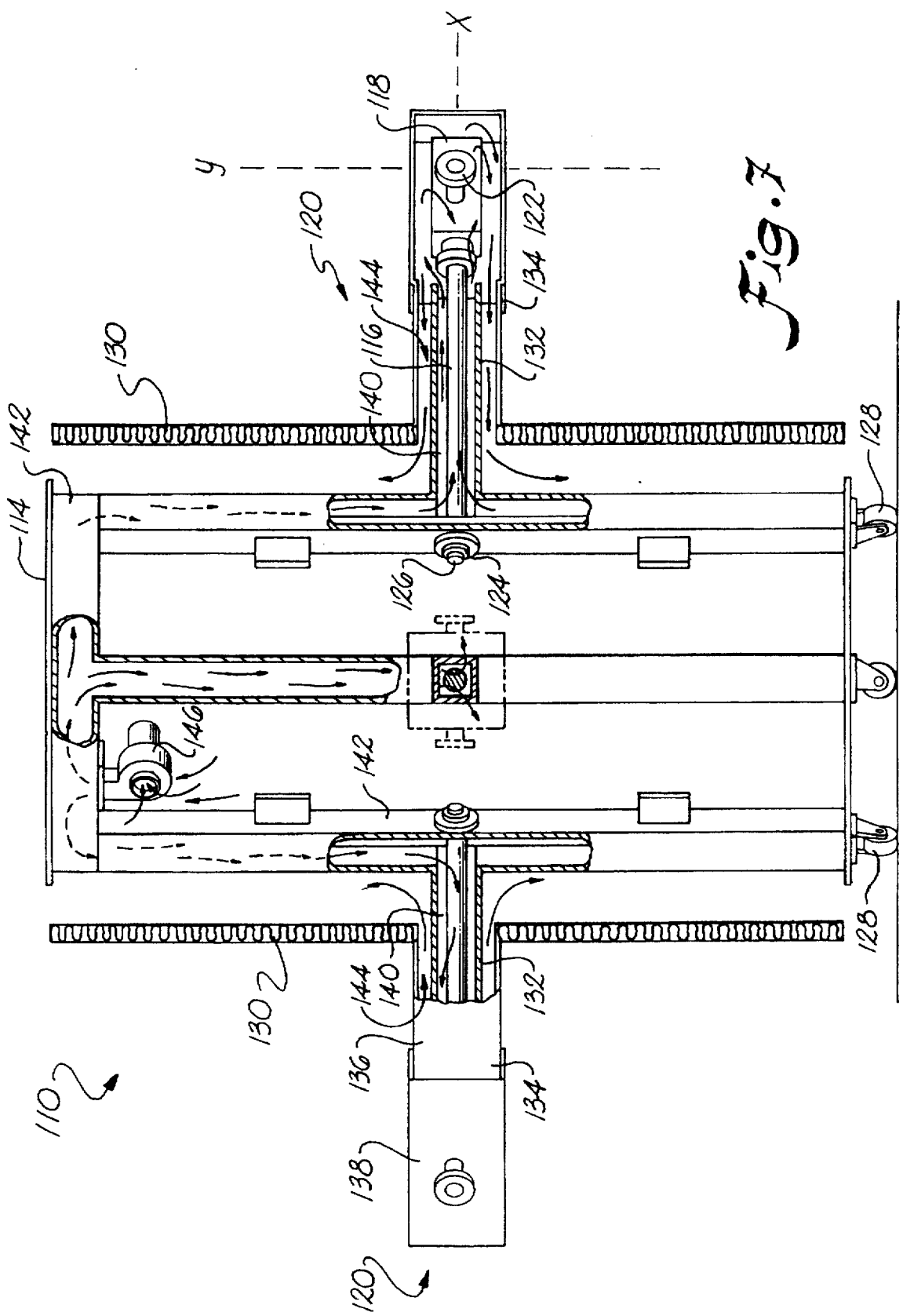

METHOD AND APPARATUS FOR INTERNALLY AND EXTERNALLY COATING ENCLOSED METALLIC STRUCTURES

FIELD OF THE INVENTION

The present invention relates generally to a process and apparatus for coating an enclosed structure with polymers and more particularly to a process and apparatus for rotationally applying a polymer to internally and externally coat enclosed metallic structures such as tanks and the like.

BACKGROUND OF THE INVENTION

Rotational molding is a known process utilized to form plastic containers or to line tanks and the like. Generally, rotational molding involves placing a polymeric material in a mold or a tank. The mold or tank is then rotated while being heated to a temperature sufficient to melt the polymer. The mold or tank can be rotated about one axis or two axes depending upon the particular application. The mold or tank is rotated until the polymer has completely melted and has been evenly distributed about the interior of the rotated article. The mold or tank is then allowed to cool. If a mold is used, the formed polymer can then be removed therefrom and used as desired.

Numerous rotational molding apparatus and processes are known for molding hollow plastic containers. Such are illustrated, for example, in U.S. Pat. No. 4,167,382 to Freedman, et al., U.S. Pat. No. 4,722,678 to Wersosky, U.S. Pat. No. 4,836,963 to Gilman, Jr., U.S. Pat. No. 3,829,272 to Carillon, et al., U.S. Pat. No. 3,907,482 to Shiota, et al., U.S. Pat. No. 4,285,903 to Lemelson and U.S. Pat. No. 4,755,333 to Gray. All of these methods and apparatus are adapted for the rotational molding of hollow plastic forms.

U.S. Pat. No. 5,358,682, filed by the current inventor, is directed to a method and apparatus for rotationally applying polymers to enclosed structures. In that reference, which is incorporated herein in its entirety by reference thereto, an apparatus is disclosed for lining the interior of an enclosed structure with a polymer. The apparatus is capable of rotating the structure about a first axis and a second axis. In one embodiment, reactive polymers can be used to chemically bond a lining to the inside of the enclosed structure.

In U.S. Pat. No. 4,729,862 to Salatiello, et al. a nylon composition for use in rotational molding is disclosed. A rotational molding process is also described which uses a polyamide composition. The composition is set into a rotational mold and is heated within the mold as it is rotated. The mold can be rotated simultaneously along two perpendicular axes. The mold is heated until the composition has melted and has covered the inside surface of the mold. The mold is then cooled and the molded article is removed.

Further, a tank construction and method of manufacture is disclosed in U.S. Pat. No. 5,217,140 to Lindahl. The tank construction includes an outer shell of steel material comprised of two half members welded together. The half members are formed by a deep drawing process. An inner shell of noncorrosive material, such as a polymer material, is cast inside the outer shell by a rotational casting procedure with the external surface of the inner shell located adjacent the internal surface of the outer shell. The rotational casting of the inner shell inside the outer shell is accomplished by charging the outer shell with a noncorrosive material and then subjecting the outer shell to a rotational casting movement while heat is applied to the outer shell. The tank construction is primarily designed for use as a water heater.

Although the prior art shows various apparatus and processes utilizing rotational techniques, the particular features of the present invention remain absent. For instance, the prior art is primarily directed to making plastic articles and is not concerned with coating and protecting enclosed structures. Further, although some of the prior art discusses lining the interior surface of various tanks, the prior art is generally deficient in also coating the tanks externally. In the past, if tanks or other similar structures were externally coated, they were coated with paint which only provides limited protection. As such, a need exists for an apparatus and process for internally and externally coating enclosed structures with a polymeric material.

Coating the interior surface and the exterior surface of an enclosed structure has many advantages. First, the coating protects the underlying structure from its contents or from the external environment. The coating is corrosive resistant and can be made to be resilient to acidic and caustic solutions. Further, a metallic structure enclosed within a polymeric coating becomes dielectric, meaning that the structure will not conduct electricity.

The prior art is also generally deficient in providing an apparatus adapted to coat enclosed structures internally as well as externally. The present invention not only provides such an apparatus, but also provides a rotational molding device that further includes a unique cooling system for preventing polymeric materials from bonding to the device itself during coating.

SUMMARY OF THE INVENTION

The present invention recognizes and addresses the foregoing disadvantages, and others, of known methods and apparatus for applying polymeric materials to enclosed structures and the like.

Accordingly, it is an object of the present invention to provide an improved method and apparatus for applying polymeric materials to enclosed structures and tanks.

It is another object of the present invention to provide an improved method and apparatus for internally and externally coating enclosed structures and tanks.

It is another object of the present invention to provide an improved apparatus for applying a polymeric material to a rotating article.

Another object of the present invention is to provide an improved process and apparatus for applying a protective coating to enclosed structures and tanks.

Still another object of the present invention is to provide an improved process and apparatus for coating enclosed structures and tanks with a polymeric material that chemically bonds to the surfaces of the structure or tank.

Another object of the present invention is to provide an apparatus for applying a polymeric material to a structure, wherein the apparatus includes arms cooled by a cooling fluid to prevent the coating material from bonding thereto.

These and other objects are achieved by providing a process for forming a polymeric protective covering on an enclosed structure. The process includes the steps of providing an enclosed structure which has an interior surface and an exterior surface. A predetermined amount of a polymeric material is placed inside the enclosed structure. The enclosed structure is then heated to a temperature sufficient to melt the polymeric material.

After melting the polymeric material, the polymer is distributed evenly over the interior surface of the structure. An additional predetermined amount of the polymeric material is then applied to the exterior surface of the enclosed structure while the structure is still at a temperature above the melting point of the polymeric material. As such, the enclosed structure becomes coated with the polymeric material on the interior and on the exterior surfaces.

In alternative embodiments, the enclosed structures can, instead, be first externally coated and then internally coated or can be simultaneously coated on all surfaces with the polymer.

The process can further include the step of cooling the coated enclosed structure for allowing the melted polymeric material to bond to the surfaces of the structure. The polymer chosen can chemically or mechanically bond to the enclosed structure. Preferably, the polymeric material is a polyolefin.

In order to chemically bond the polymeric material to the enclosed structure, the polyolefin can have functional monomers chemically attached thereto. For instance, the polyolefin may be a homopolymer or copolymer of a polyethylene, polypropylene, ethylene vinyl acetate, or the like. The functional monomers can include acrylic acid, methacrylic acid, maleic anhydrides or similar compounds.

In one embodiment, the enclosed structure can be rotated about a first axis and a second axis while coating the internal surface. In applying the additional polymer to the exterior surface of the enclosed structure, rotation about the first axis is preferably continued.

In another embodiment of the present invention a process is provided for coating an enclosed structure with a polymeric material. The process includes the steps of securing an enclosed structure to an apparatus adapted to rotate the enclosed structure about a first axis and a second axis. The axes can correspond to the X axis and the Y axis. The interior of the enclosed structure is loaded with a predetermined amount of a first polymeric material. The enclosed structure is then heated while being rotated simultaneously about the first axis and the second axis. The structure is heated to a temperature sufficient to melt the polymeric material in order to uniformly coat the inside surface of the enclosed structure. The heating step can, for instance, take place in a conventional oven.

After heating, a second polymeric material can then be applied to the outside surface of the enclosed structure while the structure is still rotating about the first axis and while the structure is still at a temperature sufficient to melt the second polymeric material. Application of the second polymeric material is for coating the outside surface of the enclosed structure.

Optionally, the enclosed structure can be coated in a different sequence or the process can also include the step of preheating the enclosed structure prior to being placed inside the oven. Again, the polymeric material chosen to coat the enclosed structure can include polyolefins that mechanically or chemically bond to the surfaces of the structure. The enclosed structure can be a tank, a tube, a barrel, a pipe, or the like.

These and other objects are also achieved by providing an apparatus for internally and externally coating an enclosed structure with polymeric materials. The apparatus includes a main support and driving member in operative association with a plurality of arms. The arms are adapted to secure an enclosed structure thereto and to rotate the enclosed structure about a first axis and a second axis. The arms can include rotating means for permitting the structures to rotate. Drive means such as a motor can be supported upon the main support and driving member for causing the structures to rotate. During operation, the main support and driving member shifts the arms to predetermined stations for loading enclosed structures, heating the structures, internally coating the structures with a polymeric material, externally coating the structures and ultimately unloading the structures.

In one embodiment, the arms include first and second longitudinally spaced end members. The end members are adapted to matingly engage elements on the enclosed structure. In particular, the end members can include hook like connectors for engaging loop elements on the enclosed structure. The arms can also include a shield for protecting them during the application of the polymers.

In one embodiment, the rotational molding apparatus can include a cooling system for cooling the arms and the rotating means. The cooling system includes a cooling fluid channel located along the arms. Air conveying means in operative association with the cooling fluid channel forces a cooling fluid through the channel and around the rotating means. A fluid return is also included that interconnects with the cooling fluid channel at the far end of the arms. The fluid return extends from the end of the arms to the main support member. During operation, cooling fluid, such as air, is forced through the cooling channel and then is directed into the fluid return where it is released remote from the far end of the arm so that the fluid does not interfere with the rotational molding process.

In a preferred embodiment, the cooling fluid channel and the fluid return are located within each arm and are concentrically oriented with respect to each other. The main support member can be made from a hollow frame onto which the air conveying means can be mounted. The hollow frame can feed directly into the cooling fluid channels located in each arm.

In another embodiment, the main support and driving member can include a pivotable turnstile. The turnstile can pivot the arms to the predetermined stations. The predetermined stations can be separated by moveable doors.

Other objects features and aspects of the present invention are discussed in greater detail below.

BRIEF DESCRIPTION OF THE DRAWINGS

A full and enabling disclosure of the present invention, including the best mode thereof, to one skilled in the art, is set forth more particularly in the remainder of the specification including reference to the accompanying figures in which:

FIG. 3 is a perspective view of the apparatus illustrated in FIG. 1;

FIG. 7 is a side view with cut away portions of an apparatus used in rotational molding that includes means for cooling the arms and corresponding gearboxes.

Figure 1:
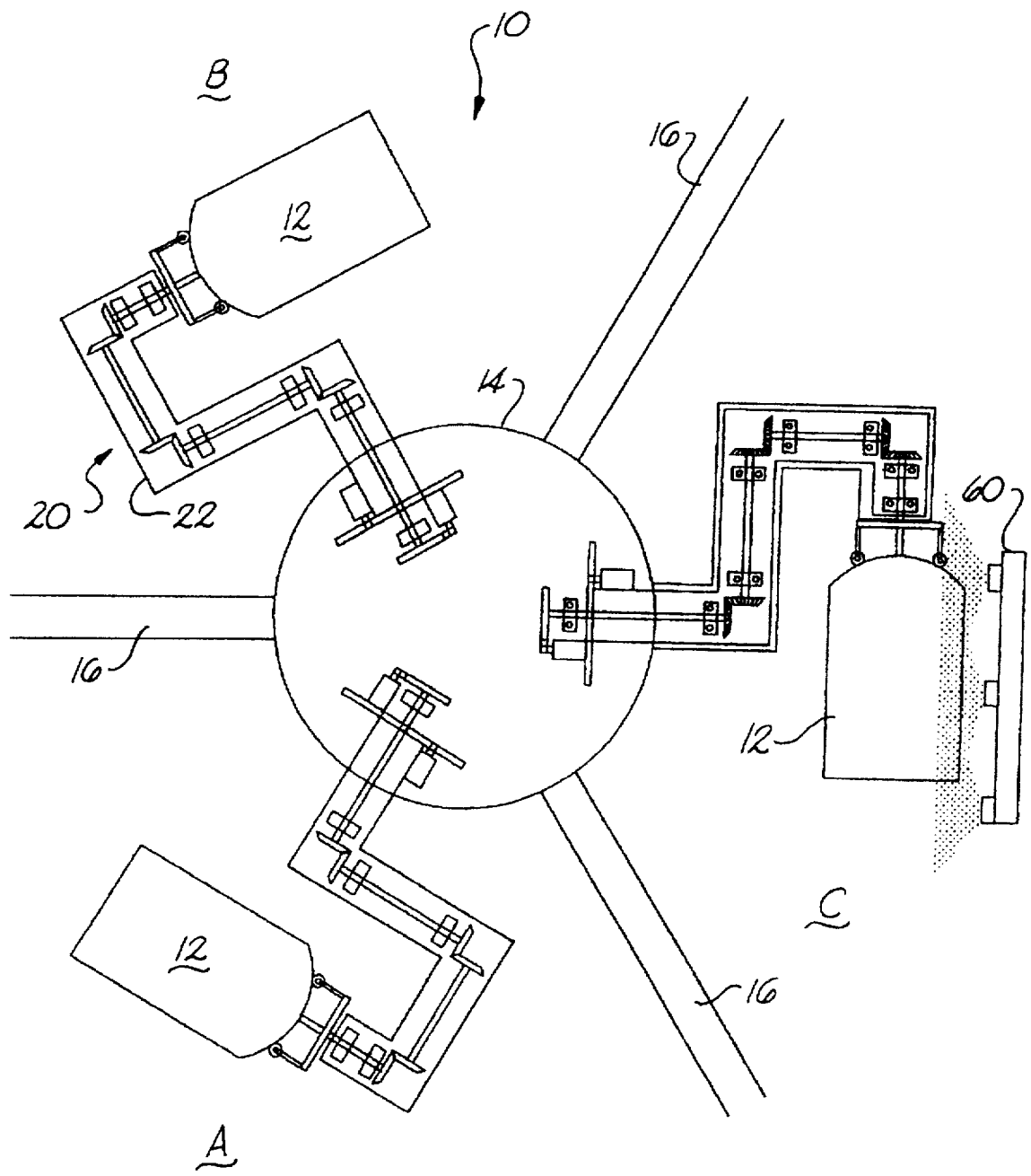
FIG. 1 is a plan view with cut away portions illustrating one embodiment of an apparatus that can be used in the process of the present invention.

Repeat use of reference characters in the present specification and drawings is intended to represent same or analogous features or elements of the invention.

DETAILED DESCRIPTION OF PREFERRED EMBODIMENTS

The present invention generally relates to a process and apparatus for internally and externally coating an enclosed structure with a polymeric material. As used herein, an enclosed structure refers to any metallic article that has an interior surface and an exterior surface such as tanks, barrels, drums, pipes, tubes, or the like. As used herein, metallic refers to any non-polymeric material. The process includes placing a predetermined amount of a polymeric material into the inside of an enclosed structure. The enclosed structure is then heated to a temperature sufficient to melt the polymeric material. During heating, the structure can be rotated about a first axis and a second axis for distributing the melted polymeric material about the interior surface of the structure.

To coat the exterior surface, the enclosed structure can be removed from the heating source and, while still hot, can have a polymeric material applied thereto. During application of the polymer, the enclosed structure is preferably still rotating about the first axis. This continuous rotation not only evenly distributes the polymer on the outside surface of the structure but also prevents the polymer coated on the interior surface from pooling or running.

In various embodiments of the process of the present invention, the enclosed structure can be first coated internally and then externally, can be first coated externally and then internally, or can have the external and internal surfaces coated simultaneously. Of importance, is that the enclosed structure is coated using only one heat cycle. As used herein, one heat cycle refers to heating an enclosed structure and then allowing the structure to cool. Some polymeric materials tend to degrade when heated and melted repeatedly or when exposed to multiple heat cycles.

In a preferred embodiment, an enclosed structure is first placed in a conventional oven and coated internally. The enclosed structure is then removed from the heat source and coated externally before the structure has cooled. In this arrangement, when the enclosed structure is placed in the oven, the external surface of the structure is in direct contact with the heat and therefore, is at a higher temperature than the internal surface of the enclosed structure. Consequently, when removed from the heat source, residual heat emanating from the external surface is sufficient to melt and/or bond a polymeric material for coating the enclosed structure externally. Likewise, if the enclosed structure were heated from a heat source placed inside the structure, it would be more advantageous, in this embodiment, to first coat the structure externally.

The enclosed structure is cooled after being coated internally and externally. Depending upon the particular material used, the coating can be chemically or mechanically bonded to the surfaces of the structure. Coating both surfaces of an enclosed structure can be done for various reasons. The coating can protect the structure from the environment in which it is to be placed and used. In particular, the coating can be used to protect the enclosed structure from acidic and caustic solutions.

For instance, in one particular application, metal tanks can be coated with a polymeric material in accordance with the present invention. The tanks can then be used to hold acidic and caustic solutions for use in chemical processes. For example, acid and caustic tanks are needed in water purifiers such as demineralizers, where the acidic and caustic solutions are used to regenerate ion exchange beds.

Of course, articles manufactured according to the present process can be used in numerous other applications. For example, the coatings are also resistant to chipping, making the enclosed structures well suited for carrying abrasive materials such as sand and gravel.

Many different types of apparatus and equipment can be used to carry out the process of the present invention. One example of an apparatus for use in the present invention is illustrated in FIGS. 1 and 3. Referring to FIG. 1, an internal and external coating apparatus generally 10 is illustrated having three separate stations A, B, and C for processing enclosed structures 12. Enclosed structure 12 begins processing at Station A, is moved to Station B and then completes processing at Station C. Station A is for loading and unloading enclosed structure 12. Station B is for loading a polymeric material into structure 12, heating the enclosed structure, and rotating the enclosed structure about two axes. At Station C, a polymeric material is applied to the external surface of enclosed structure 12 while the structure is at a temperature above the melting point of the polymeric material. As shown in the figure, an applicator 60 can be used to apply the material externally. During this step, rotation about one axis is continued.

In order to rotate between stations A, B, and C, apparatus 10 includes a rotatable turnstile 14 as better shown in FIG. 3. Turnstile 14 includes motorized wheels 74 for rotating same. The stations are separated by doors 16 which can slide or move out of the way when turnstile 14 is rotated. Enclosed structures 12 are supported on arms generally 20 which extend from turnstile 14. Arms 20 are adapted to attach to enclosed structures 12 and to rotate the structures about two different axes.

Arms 20 preferably include, which can be made from a structural plastic or metallic material, 22 for protecting and covering each arm. Covering 22 is designed to completely cover arm 20 without inhibiting the rotation of enclosed structure 12. In FIG. 1, the top portion of covering 22 is not shown so that the internal workings of arm 20 can be viewed. As shown in FIG. 3, arms 20 also include means for holding an enclosed structure. As embodied herein, the means for holding an enclosed structure is generally illustrated at 24. Any attachment mechanism can be used in the apparatus of the present invention. The attachment means included in apparatus 10 will depend significantly upon the shape and design of enclosed structure 12.

One embodiment of an attachment structure generally 24 is illustrated in FIG. 3. Attachment structure 24 includes a hook type connector 26 adapted to engage a connection portion 28 on enclosed structure 12. Connection portion 28 can include a washer or metal loop welded to enclosed structure 12. Connectors 26 are attached to a top plate 30 which can include stabilizer arms 31.

Preferably, hook-type connectors 26 are made from or coated with TEFLON in order to prevent the polymeric coating materials from sticking to or bonding with the hooks. Similarly, plate 30 and arms 31 can also be coated or made from TEFLON.

Figure 2A:
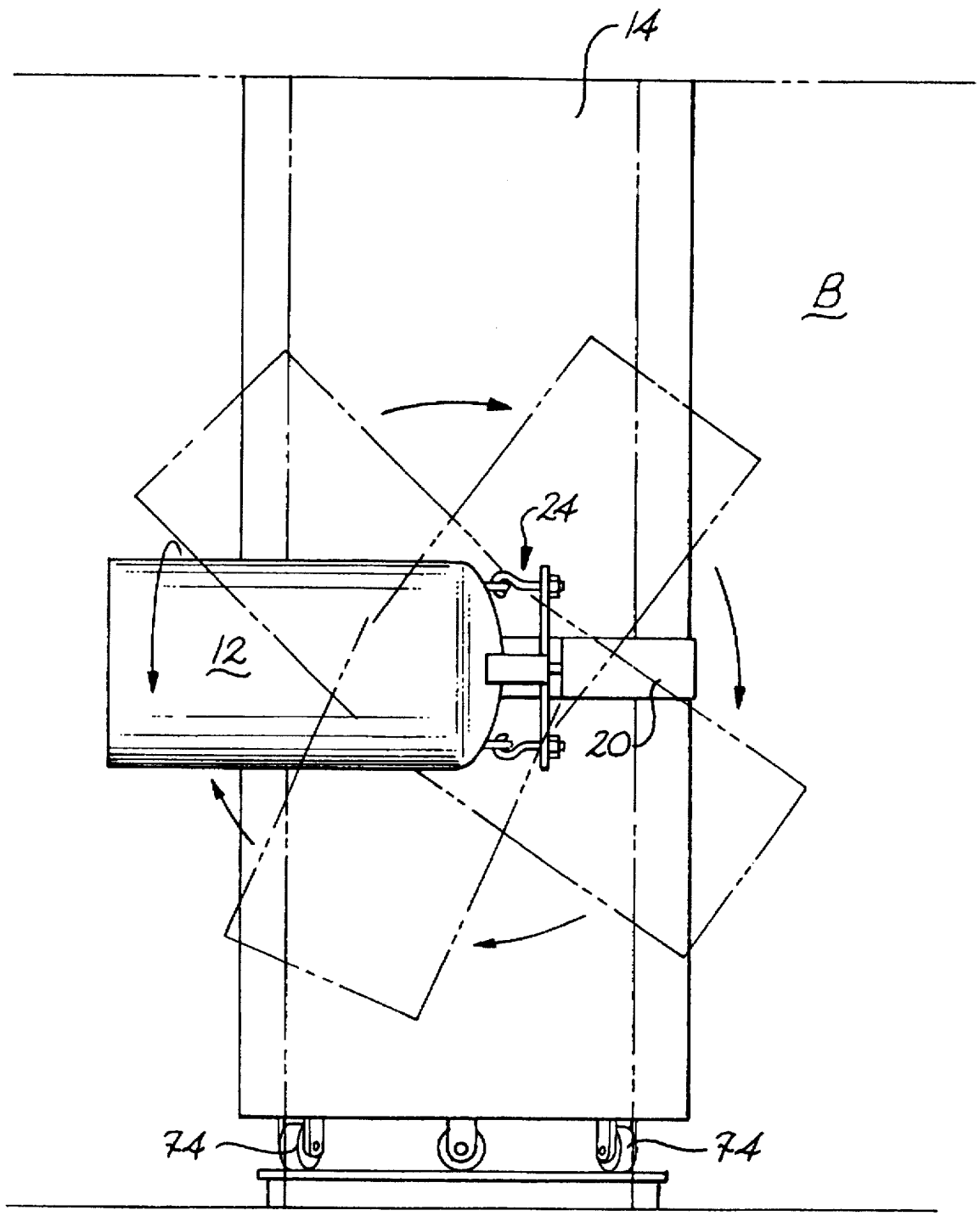
FIG. 2A is a side view of the apparatus illustrated in FIG. 1.

Once attached to and supporting enclosed structure 12, arm 20 is capable of rotating the enclosed structure about a first axis and a second axis as illustrated in FIG. 2A. For instance, the enclosed structure 12 can be rotated about the horizontal axis or X axis and rotated about the vertical axis or Y axis.

Figure 2B:
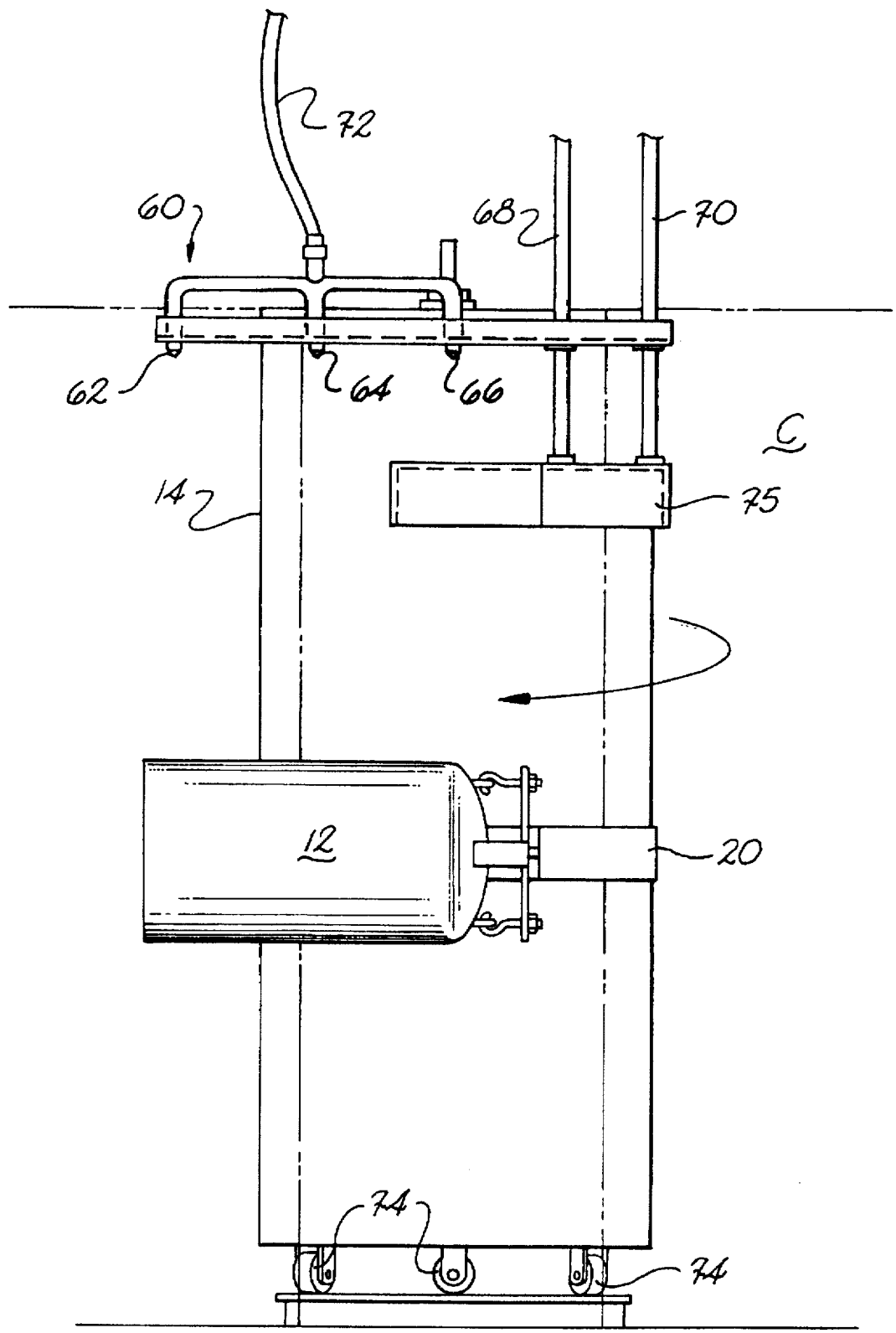
FIG. 2B is a side view of the apparatus illustrated in FIG. 1.
Figure 2C:
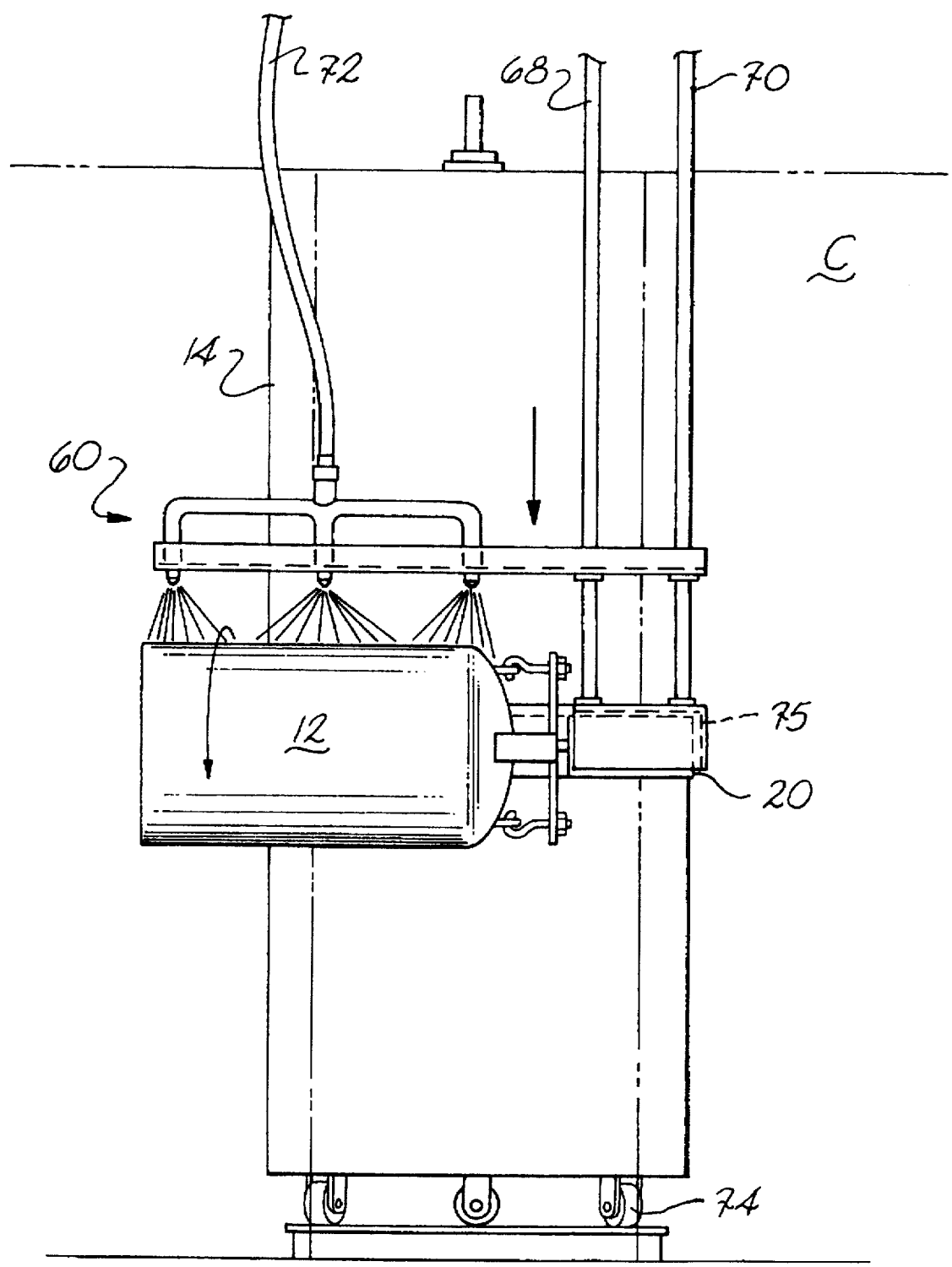
FIG. 2C is a side view of the apparatus illustrated in FIG. 1.

Referring now to FIGS. 2A, 2B and 2C, various side views of the internal and external coating apparatus illustrated in FIGS. 1 and 3 are shown. In particular, stations B and C are illustrated. As described above, moveable doors 16 as shown in FIGS. 1 and 3 separate the stations.

Referring specifically to FIG. 2A, an enclosed structure 12 at station B is shown supported by an arm 20. At station B, enclosed structure 12 is filled with a polymeric material, which can be in the form of a liquid or solid, and heated. Station B, therefore, can be located inside an oven separated by doors 16. While being heated, arm 20 rotates enclosed structure 12 about two axes such as the X axis and the Y axis as shown in the figure.

Figure 5:
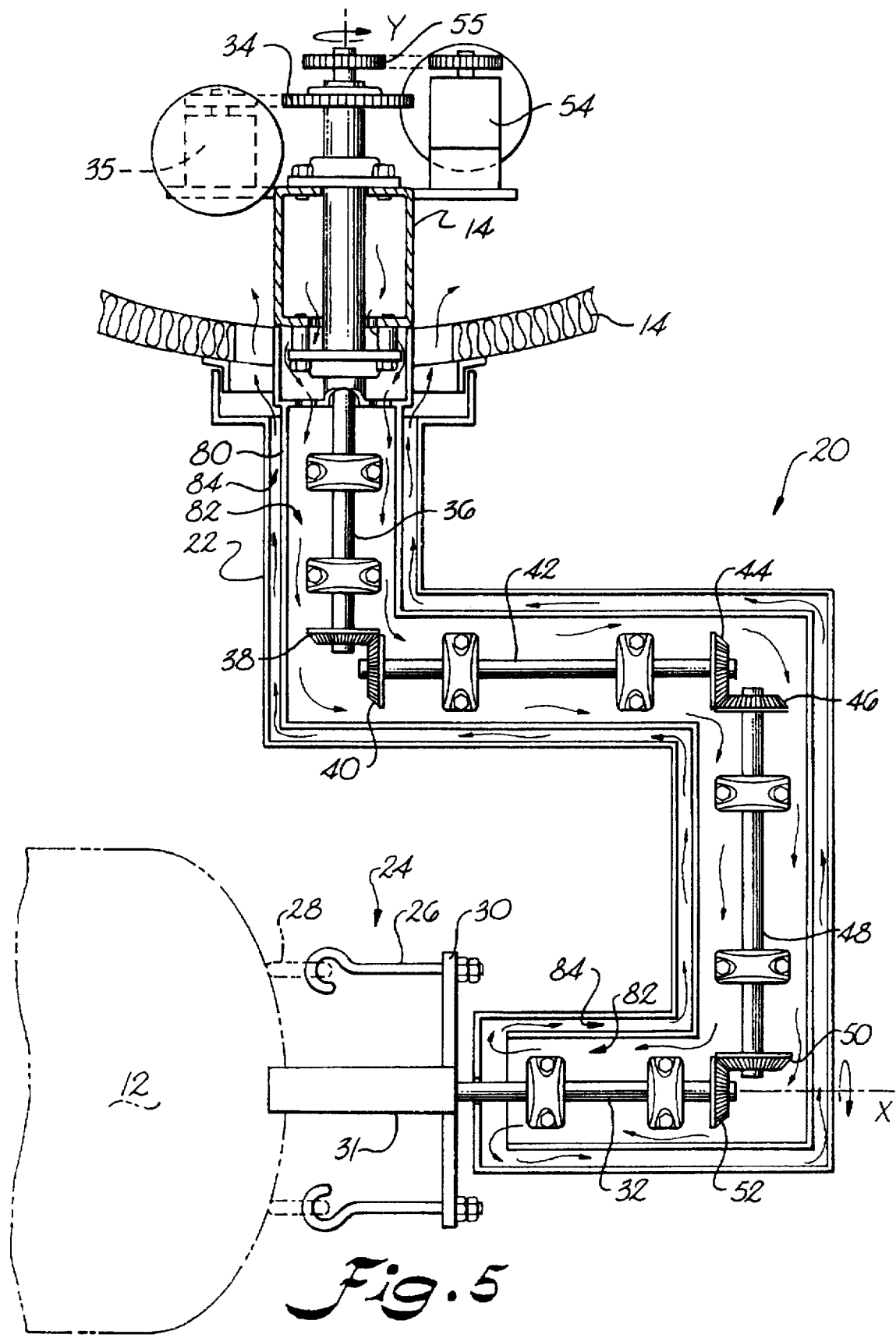
FIG. 5 is plan view taken along lines 5—5 of FIG. 4.

Referring now to FIG. 5, the internal workings of arm 20 are shown in detail. As stated, once attached to and supporting enclosed structure 12, arm 20 is capable of rotating the enclosed structure about a first axis, X, and a second axis, Y. In order to rotate enclose structure 12 about axis Y, arm 20 includes an end portion 34, such as a gear, adapted to engage a motor 35 (as shown in phantom) which can be mounted to turnstile 14. Motor 35 engages end portion 34 and rotates entire arm 20 including covering 22 about axis Y.

In order to rotate enclosed structure 12 about the first axis X, arm 20 includes a network of shafts and gears which ultimately connect enclosed structure 12 to a motor 54. Specifically, arm 20 includes a first shaft 36 having a gear 38 mounted to its end. Gear 38 is engaged with a gear 40 which in turn is mounted to a shaft 42. Shaft 42 includes a second gear 44 in communication with a gear 46 mounted to a shaft 48. Shaft 48 likewise contains a second gear 50 in communication with a gear 52 which is mounted on shaft 32. Shaft 32 is connected to top plate 30 of attachment structure 24.

In order to rotate shaft 36, arm 20 includes motor 54. Motor 54 is adapted to engage an end portion or gear 55 located at the end of shaft 36. In this arrangement, the rotation of shaft 36 causes enclosed structure 12 to rotate about the X axis. As would be apparent to one skilled in the art, the above described mechanism is merely one embodiment of a means for rotating an enclosed structure. As such, other arrangements may be used in the illustrated apparatus.

In FIG. 5, a means for cooling arm 20 is also illustrated which will be discussed in more detail hereinafter.

Figure 4:
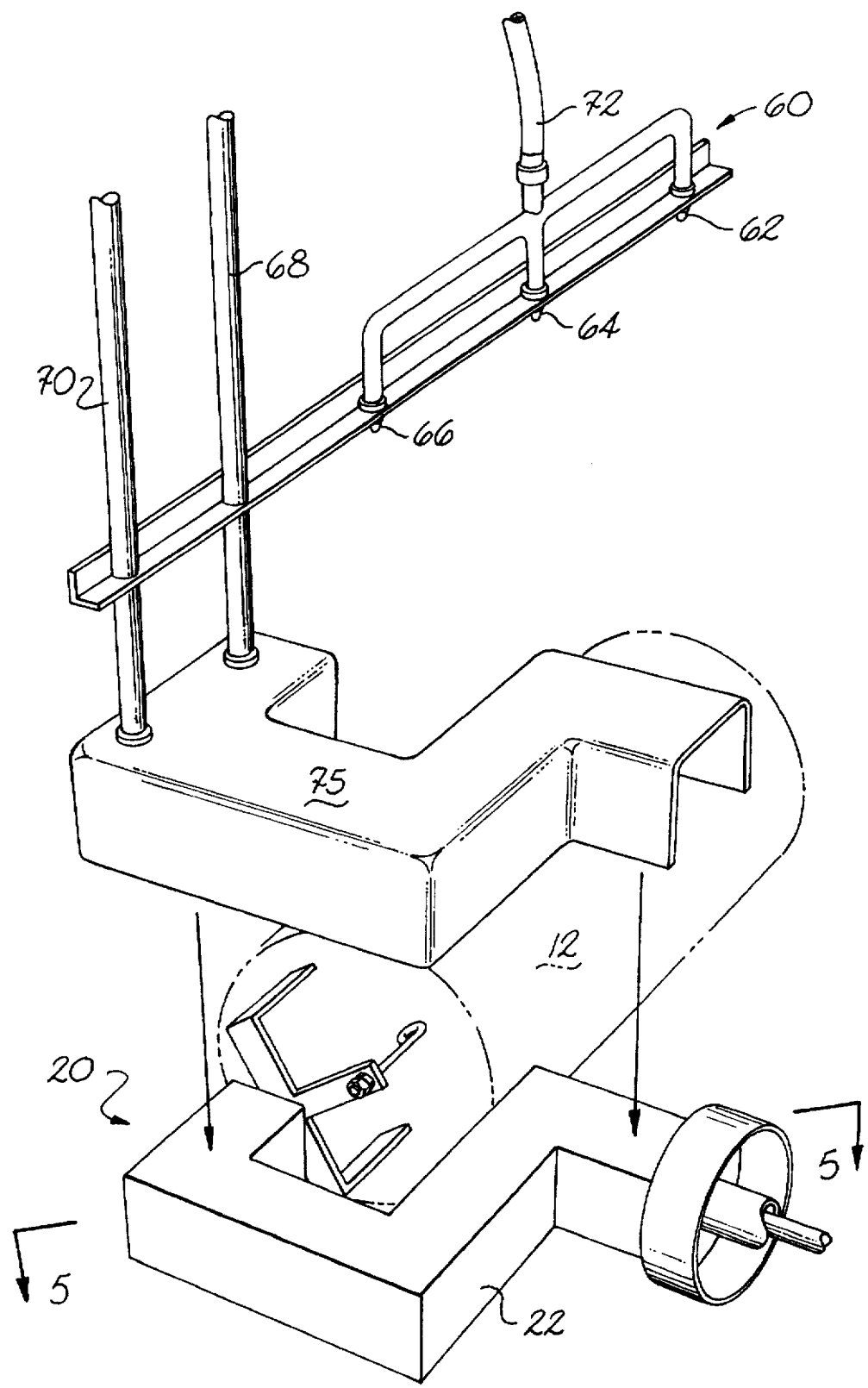
FIG. 4 is a perspective view of an arm used in the apparatus illustrated in FIG. 1 including a shield and an applicator for applying a polymer to an enclosed structure.

After the polymeric material inside enclosed structure 12 has melted and has evenly distributed over the interior surface of the enclosed structure at station B, heating is discontinued and arm 20 is rotated to station C as shown in FIGS. 2B, 2C and 4. At station C, enclosed structure 12 is positioned beneath applicator 60 for applying a polymeric material to the exterior surface of the structure. While the temperature of enclosed structure 12 is still above the melting point of the polymeric material, this additional material is applied to the external surface of the enclosed structure. The residual heat contained within the enclosed structure is used to melt the polymeric material on to the external surface of the structure without the aid of a heat source. During the second application of polymeric material, enclosed structure 12 is continually rotated about the X axis by arm 20.

Referring to FIG. 2B, applicator 60 is shown supported by a pair of support arms 68 and 70 above enclosed structure 12. In this embodiment, applicator 60 includes ports 62, 64, and 66 which are in communication with a hose 72. When enclosed structure 12 is rotated to station C, applicator 60 is brought down in closer proximity to the structure as shown in FIG. 2C.

Referring to FIG. 2C, a polymeric material is fed through hose 72, out ports 62, 64, and 66 and onto the exterior of enclosed structure 12. As discussed above, at station C, the outside surface of enclosed structure 12 is at a temperature above the melting point of the polymeric material and the structure is being rotated about the X axis.

During the application of the polymeric material to the exterior surface of the enclosed structure 12, applicator 60 can also be in operative association with a shield 75. Shield 75 is provided to cover arm 20 for preventing any polymeric material or any other foreign matter from sticking to or bonding with the arm.

Referring to FIG. 4, shield 75 is more clearly illustrated. As shown, shield 75 is also suspended by support arms 68 and 70. Preferably, the shield is shaped to the contours of arm 20 for completely encasing and protecting same. Shield 75 can be made from a light-weight structural material such as a metal or a plastic.

After being externally coated, enclosed structure 12 is then rotated to station A for cooling and removal. When rotating enclosed structure 12 to station A, door 16 is slid or lifted out of its path. In the embodiments shown, turnstile 14 is rotated to each station by motor driven wheels 74.

A detailed description of the process of the present invention using apparatus 10 as illustrated in the figures will now be described. Referring to the figures, an enclosed structure 12 is first loaded onto apparatus 10 by being attached to arm 20. Doors 16 are then moved and turnstile 14 is rotated until enclosed structure 12 is at station B. At station B, a predetermined amount of a polymeric material is placed inside structure 12. A heating device such as an oven is then used to heat the enclosed structure to a temperature sufficient to melt the polymeric material. The oven may include any conventional heating source such as gas or electric and may include conventional time and temperature controls. Specifically, enclosed structure 12 is heated to a temperature above the melting point of the polymeric material but at a temperature insufficient to degrade the polymeric material.

During this heating step, the enclosed structure 12 is at least rotated about the X axis and can also be simultaneous rotated about the Y axis. This rotation causes the melted polymeric material to distribute evenly over the interior surface of the enclosed structure. Heating continues at step B until all of the polymeric material has melted.

In an alternative embodiment, apparatus 10 may also include means for preheating enclosed structure 12. For instance, a duct can be extended into enclosed structure 12 for forcing hot air therethrough. In another embodiment, an electrical heating rod can be extended to or within the enclosed structure in order to preheat the structure.

After enclosed structure 12 is internally coated at station B, doors 16 again move and enclosed structure 12 is rotated to station C. At station C, rotation about the Y axis is stopped while rotation about the X axis is continued in order to prevent the melted polymeric material on the interior of the enclosed structure from pooling or running. Also at station C, enclosed structure 12 is positioned adjacent to an applicator, such as a spray device, for applying a polymeric material to the exterior surface.

At station C, enclosed structure 12 is cooling but the outside surface is still at a relatively high temperature. As described above, applicator 60 applies the polymeric material to the exterior surface of the structure while the exterior surface of the structure is at a temperature sufficient to melt the polymeric material. The polymeric material used to coat the exterior surface of enclosed structure 12 does not necessarily have to be the same polymeric material used to coat the interior surface of the enclosed structure. Different coatings may be selected as desired.

After a relatively uniform coating of a polymeric material is applied to the exterior surface, enclosed structure 12 is allowed to continue cooling and is rotated to station A. After adequate cooling, enclosed structure 12 is removed from apparatus 10 and used as desired.

In another embodiment, apparatus 10 of the present invention can be modified so that enclosed structures 12 are first coated externally at station B and then coated internally at station C. In this embodiment, the enclosed structures are preferably heated from the inside. As such, instead of a conventional oven, at station B, a heating source can be provided that can be inserted within structures 12. Such a heating source may include an electrical rod.

After being heated internally, the exterior surface of enclosed structure 12 can be coated with a polymeric material. After coating the external surface, the heating source can be removed and enclosed structure 12 can be rotated to station C. At station C, a second predetermined amount of polymeric material can be loaded into the structure for coating the interior surface. As before, the residual heat can be used to melt the polymer and allow it to bond to the surfaces. As before, during this process, enclosed structure 12 can be rotated about the X axis and/or the Y axis.

In still another embodiment, apparatus 10 can be adapted to simultaneously coat the interior surface and the exterior surface of an enclosed structure with a polymeric material. In this embodiment, an enclosed structure is preferably heated before being coated. For instance, referring to FIG. 1, at station B, enclosed structure 12 can be placed in a conventional oven and heated. Next, enclosed structure 12 can be rotated to station C and internally and externally coated while the structure is at a temperature sufficient to melt the polymer on to the surfaces.

In another embodiment, the enclosed structure can also be coated internally and externally with the polymeric material while at station B inside the oven. As such only two stations would be needed. However, in this arrangement, it would be very difficult to control the polymeric material from not only coating the enclosed structure but also coating the walls of the oven and any other objects found therein. By first removing the enclosed structure from the heat source and rotating it to station C, the application of the polymer can be more controlled.

As described above, apparatus 10 can be adapted to first coat the interior of the enclosed structure, to first coat the exterior of the enclosed structure, or to simultaneously coat the interior and exterior surfaces of the structure. In each of these three embodiments, only one heating cycle is needed. In other words, the enclosed structure is only heated one time. The process and apparatus of the present invention attempt to avoid having to reheat and remelt the polymeric material which, depending upon the material chosen, may degrade the polymer. Repeated heating cycles certainly increase production time and production costs.

Various polymeric materials may be used in the process and apparatus of the present invention. The polymeric materials can form a mechanical or a chemical bond with the surfaces of the enclosed structures. The polymeric materials can be applied to the structures in a wet form or in a dry form. In particular, the polymers can be applied to the surfaces of the enclosed structure using a fluidized bed, can be applied electrostatically, or the structures can be powder coated. These various methods, including others, are well known in the art and are within the scope of the present invention.

Particular polymers found useful in the process of the present invention include polyethylene and polypropylene. However, any other suitable polyolefin can be used.

In a preferred embodiment, a polymer is chosen that will chemically bond to the surfaces of the enclosed structure. Such polymers include polyolefins having functional monomers grafted thereto. Such polymeric materials can chemically bond to metal surfaces when heated. The polyolefins may include homopolymers or copolymers of polyethylenes polypropylenes, ethylene vinyl acetate and the like. Functional monomers that can be grafted to these polyolefins include acrylic acid, methacrylic acid, maleic anhydrides and the like. Exemplary commercial polymeric materials suitable for use in the process of the present invention include the POLYBOND products manufactured by BP Performance Polymers, Inc. and the PLEXAR products manufactured by Quantum Chemical Corporation. These polymers chemically bond to most metal surfaces including steel, brass, aluminum, copper, zinc alloys and other alloys.

These particular polymers, by chemically bonding to the surfaces of the enclosed structure, have demonstrated to be more durable during use. Of course, conventional polymeric materials can be employed depending upon the particular application of the final product and any economical factors that may exist.

When using these chemically reactive polymers, preferably the surface of the underlying metallic structure is first washed and cleaned before being coated in order to remove any dirt or oily materials. It is also preferred, that prior to bonding, a neutral to acidic pH be maintained on the surface to be coated. Preparation of the enclosed structure can be performed by washing the structure in a dilute acid, such as an aqueous solution containing hydrochloric acid or sulfuric acid. After washing, the surface should be dried before the chemical reactive polymers are applied.

Many of the chemically reactive polymers described above melt at a lower temperature than which they chemically react to metallic surfaces. For instance, some of the reactive polymers described above have a melting point between about 250° Fahrenheit and about 350° Fahrenheit. These polymers chemically bond to metallic surfaces at temperatures between about 400° Fahrenheit to about 600° Fahrenheit. As such, when applying these polymers in accordance with the present invention, it is important that the temperature and pressure be sufficient for the polymer to chemically bond to the metal. Once this bond is formed and the surface of the enclosed structure is covered, then additional polymer can be added at the melting point.

In one embodiment, when using reactive polymers, the enclosed structure can be internally coated at station B as described above. The structure can then be rotated to station C and, while still at a temperature sufficient to chemically bond the polymer to the exterior surface, the structure is coated externally. Additional coats of polymer can be applied to the external surface of the structure until a desired thickness is achieved. If a thick coating is desired, it may be possible to supply additional heat directed to the exterior surface of the structure. Such a heat source could include an infra red heat lamp. This heat source must maintain a temperature above the melting point of the polymer in order for more coats to be applied. However, the temperature needed to chemically bond the polymer to a metallic surface would not be required for adding additional coats.

Figure 6:
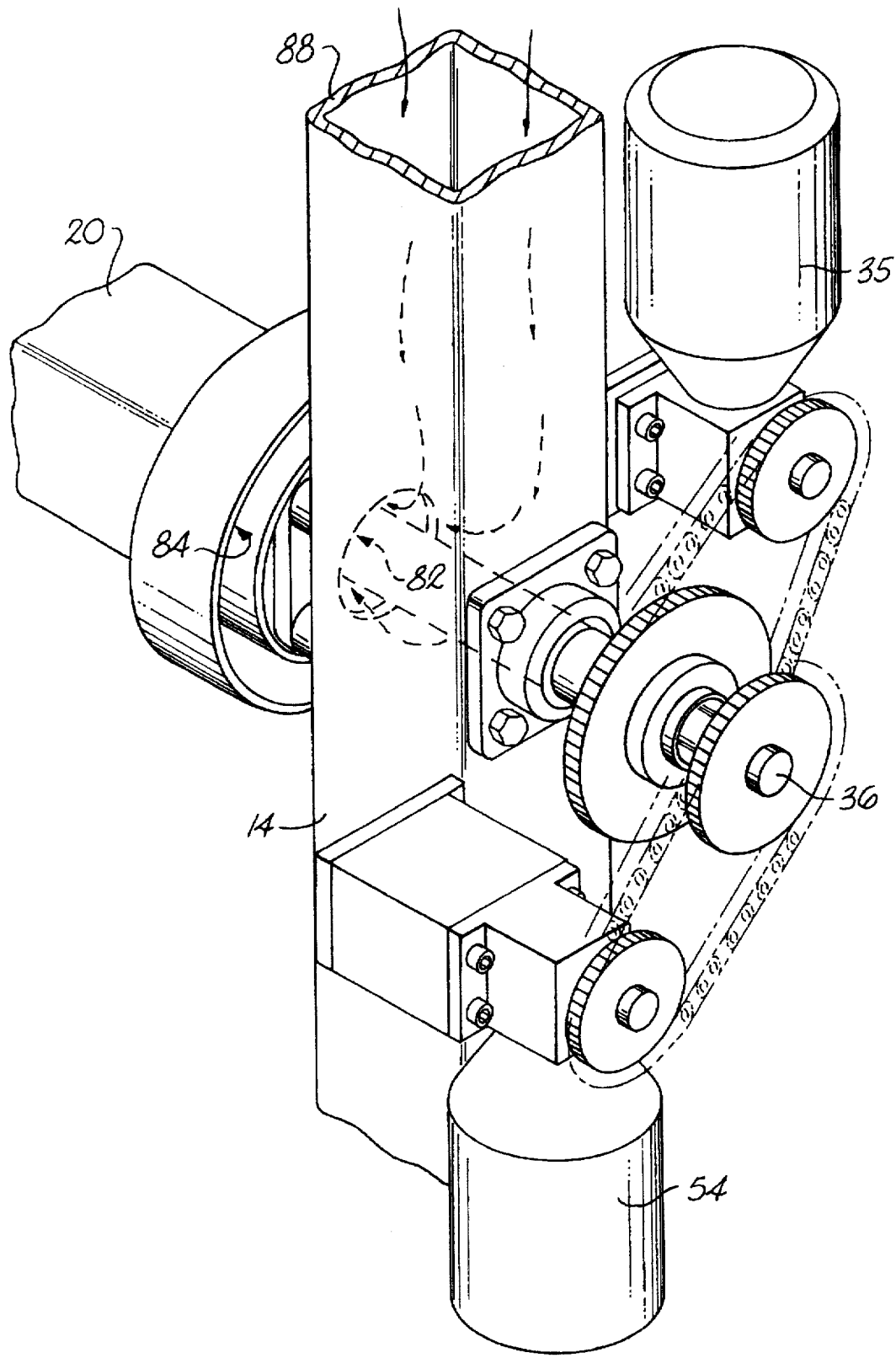
FIG. 6 is a perspective view with cutaway portions illustrating the means by which an arm in a rotational molding apparatus may be rotated.

Referring now to FIGS. 5, 6 and 7, in order to prevent the build-up of polymeric material onto protective covering 22 of arm 20 during processing, a means can be included within apparatus 10 for cooling covering 22 and arms 20 in addition to or in lieu of using shield 75. In particular, when enclosed structure 12 is being rotated between stations, the cooling means can be applied to arms 20 without cooling the structure being heated. If the arms are cooled to a temperature below the melting point of the coating material, the polymeric material will not melt and bond to covering 22. Cooling the arms of the apparatus also prevents the greases and lubricants contained within the arms from breaking down and degrading due to exposure to high temperatures. If these lubricants were to fail, the bearings contained within the arms may wear out rapidly.

One method for cooling arms 20 of apparatus 10 is illustrated in FIGS. 5 and 6. As shown in FIG. 5, arm 20 a has a dual-housing arrangement. Besides protective covering 22, arm 20 also includes an interior housing 80. This two-housing arrangement creates respective channels within arm 20. Specifically, arm 20 includes an interior channel or a cooling fluid channel 82 and an exterior channel or cooling fluid return 84. At the end of arm 20 adjacent enclosed structure 12, cooling fluid channel 82 feeds into cooling fluid return 84.

In this arrangement, a cooling fluid such as a liquid or gas can be forced into cooling fluid channel 82 and circulated down the length of arm 20. The cooling fluid can then enter or flow into cooling fluid return 84 and recirculated back down the length of the arm and released or recycled. The cooling fluid is capable of cooling the internal workings of arm 20 and protective covering 22. By cooling covering 22, the cooling fluid will prevent the build up of polymeric materials on the arm.

Referring to FIG. 6, the intersection of arm 20 with turnstile 14 is illustrated. The circular wall of turnstile 14 as shown in FIGS. 1 and 3 has been deleted for purposes of clarity. As illustrated, turnstile 14 is partially comprised of a hollow frame 88. Hollow frame 88 is in direct communication with cooling fluid channel 82 that leads into arm 20. As such, a cooling fluid can be circulated through frame 88 and into cooling channel 82 for cooling arm 20.

Referring to FIG. 3, a fluid conveying means 86 can be mounted to frame 88. Such a device can include, for example, a fan or a pump. Device 86 forces a cooling fluid into frame 88 which then flows into each of the arms. As shown in FIGS. 5 and 6, the fluid is then circulated down each arm and then returned and released or recycled at turnstile 14. Of importance, is that the cooling fluid is not released at the far end of each arm which may interfere with the processing of enclosed structures 12. As such, preferably the cooling fluid is released remote from stations A, B or C.

Referring to FIG. 7, another embodiment of a rotational molding apparatus generally 110 is shown which also may be used in the process of the present invention. Similar to the embodiment illustrated in FIGS. 1 and 3, apparatus 110 includes a main support and driving member 114 which is in the form of a rotatable turnstile. Supported upon turnstile 114 are a plurality of arms generally 120, which are adapted to support and rotate objects. In particular, arms 120, in this embodiment, include a concentric shaft arrangement for rotating articles. As shown arms 120 include an exterior shaft 116 extending from turnstile 114 to a rotating means 118 located at the far end of the arm. Projecting out from and operatively engaged with rotating means 118 is a support means 122 adapted to engage and support an article or a plurality of articles.

Not shown, arms 120 further include an interior shaft concentric with exterior shaft 116. Integral with exterior shaft 116 and mounted to turnstile 114 is a first spindle 124. A second spindle 126 is also included which is integral with the interior shaft. Spindles 124 and 126 are for engagement with a motor or any other conventional means that can be mounted to turnstile 114. Specifically, the motor or the like can be used to engage and rotate spindles 124 and 126 in turn causing exterior shaft 116 and the interior shaft to similarly rotate. Rotation of exterior shaft 16 causes the far end of arm 120 to turn, rotating support means 122 about the X axes.

Rotation of the interior shaft, on the other hand, causes support means 122 to rotate about the Y axes. Specifically, the interior shaft engages rotating means 118, which, in a preferred embodiment, includes a gear box arrangement, causing support means 122 to turn. Thus, apparatus 110 can be used to rotate enclosed structures or other articles simultaneously about two axes, similar to the apparatus illustrated in FIGS. 1 and 3.

As shown in FIG. 5, turnstile 114 includes wheels 128 used to rotate arms 120 between predetermined stations. In this embodiment, turnstile 114 also includes support walls 130. Walls 130 are primarily designed to protect and shield turnstile 114 from the various stations to which the arms are rotated. For instance, as discussed above, when rotationally molding articles, the arms and articles are typically placed in an oven and heated. When an arm is rotated and placed inside an oven, wall 130 serves as a door for separating, isolating, and shielding turnstile 114 from the interior of the oven. Of course, besides being supported upon turnstile 114, walls 130 may also be in the form of moveable doors that surround arms 120 when the arms are rotated from station to station.

As discussed above, one concern of the present invention is to maintain arms 120 at a lower temperature during the rotational molding process. A method of cooling arms 120 serves a dual purpose. First, maintaining the exterior surface of arms 120 at a lower temperature will prevent the polymeric coating materials from bonding to and accumulating on the arms. Further, it is also important to cool rotating means or gearbox 118 when the arms are exposed to higher temperatures. By cooling rotating means 118, greases and lubricants contained therein are less likely to breakdown and degrade due to exposure to heat. If the lubricants were to degrade, corresponding bearings and gears may likewise fail.

In order to cool arms 120 during operation, apparatus 110, as shown in FIG. 5, includes a means for continuously circulating a cooling fluid through the arms. Specifically, arms 120 of apparatus 110 have a dual housing arrangement. The arms include an interior housing 132 and an exterior housing 134. In particular, exterior housing 134 includes a first portion 136 and a second portion 138. Second portion 138 is rotatable with respect to first portion 136 for allowing support means 122 to rotate about the X axis in the manner as described above.

As shown, interior housing 132 surrounds and is concentric with exterior shaft 116 defining a cooling fluid channel 140. Interior housing 132 is also integral with turnstile 114. In particular turnstile 114 is made of a hollow frame 142. As such, cooling fluid channel 140 opens up into the hollow frame of turnstile 114. Exterior housing 134, on the other hand is concentric with interior housing 132 creating a cooling fluid return 144.

In order to circulate a cooling fluid through arms 120 of apparatus 110, turnstile 114 further includes an air conveying device such as a blower or fan 146. In particular, air conveying device 146 feeds a cooling fluid, such as air, into hollow frame 142 of turnstile 114. As shown by the arrows, when air conveying device 146 is operating, the cooling fluid is forced through hollow frame 142 of turnstile 114 and into cooling fluid channels 140 of arms 120. After exiting channels 140, the cooling fluid then flows around rotating means or gearbox 118 for cooling the gears and lubricants contained therein. After cooling gearbox 118, the cooling fluid is then deflected by second portion 138 of exterior housing 134 and is directed into cooling fluid returns 144. The cooling fluid is then released next to turnstile 114 on the outside of walls 130 in relation to arms 120. Ultimately, the cooling fluid can be released out an exhaust remote from the rotational molding operation.

During this process, arm 120 including gearbox 118 is continuously cooled by the forced flow of the cooling fluid. Further, by design, the cooling fluid is not released at the far end of the arms but is instead recirculated back towards turnstile 114. The cooling fluid is not released at the predetermined stations. For instance, as described above, one of the stations may include an oven or some other type of heat element. If the cooling fluid were released at the far end of each arm, the energy requirements of the oven would increase to compensate for the forced air flow therethrough. Also, if the cooling fluid were released at the end of each arm, the fluid may interfere with the application of polymers to the enclosed structures or with any other operation being performed. As such, it is important that the cooling fluid is recirculated back down the arm. Of course, besides being released where shown in FIG. 7, the cooling fluid return can also be extended into the center of turnstile 114.

In one embodiment, a similar apparatus as shown in FIG. 7 was used in a rotational molding process. Specifically, the air conveying device incorporated into the system was a $1/100$ horse power squirrel cage blower rated at approximately 90 cfm. It was found that when an arm was placed in an oven heated to 800° F., a gearbox located at the far end of the arm held inside the oven was maintained at approximately 200° F.

Of course, the method of cooling arms 120 as shown in FIGS. 5 and 7 can be incorporated into any rotational molding machine. For instance, a similar cooling arrangement can be incorporated into a rotational molding apparatus that does not have a rotatable turnstile.

These and other modifications and variations of the present invention may be practiced by those of ordinary skill in the art, without departing from the spirit and scope of the present invention, which is more particularly set forth in the appended claims. In addition, those of ordinary skill in the art will recognize that features and aspects of the various embodiments of the present invention are interchangeable both in part or in whole. Furthermore, those of ordinary skill in the art will appreciate that the foregoing description is by way of example only, and is not intended to be limitative of the invention so further described in such appended claims.

What is claimed:

1. A process for forming a polymeric coating on the exterior and interior surfaces of an enclosed structure, such process comprising the steps of:

providing an enclosed structure having an interior surface and an exterior surface;

heating said enclosed structure to a temperature sufficient to melt a first polymeric material;

distributing said first polymeric material over said interior surface of said structure while maintaining said temperature at a level sufficient to melt said first polymeric material for coating said interior surface; and applying a second polymeric material to said exterior surface of said enclosed structure while the exterior surface of said structure is still at a temperature above the melting point of said second polymeric material thereby allowing said second polymeric material to coat said exterior surface of said structure.

2. The process as defined in claim 1, further comprising the step of cooling said coated enclosed structure for allowing said melted first and second polymeric materials to bond to said interior surface and to said exterior surface.

3. The process as defined in claim 1, wherein at least one of said first and second polymeric materials chemically bonds to said enclosed structure.

4. The process as defined in claim 1, wherein at least one of said first and second polymeric materials comprises a polyolefin.

5. The process as defined in claim 4, wherein said polyolefin has functional monomers chemically attached thereto.

6. The process as defined in claim 1, wherein said enclosed structure is rotated about at least a first axis for uniformly coating the interior surface of said structure with said first polymeric material while said enclosed structure is being heated.

7. The process as defined in claim 6, wherein said enclosed structure is rotated about a first axis and a second axis while said enclosed structure is being heated, wherein rotation about said second axis is stopped while rotation about said first axis is continued when said second polymeric material is applied to said exterior surface of said enclosed structure.

8. The process as defined in claim 1, wherein said interior and exterior surfaces of said enclosed structure are coated simultaneously.

9. The process as defined in claim 1, wherein said enclosed structure is heated, said second polymeric material is then applied to said exterior surface of said structure and then said structure is loaded with said first polymeric material.

10. The process as defined in claim 1, wherein said first and said second polymeric materials are the same material.

11. The process as defined in claim 1, wherein said first polymeric material and said second polymeric material chemically bond to said interior and exterior surfaces of said enclosed structure.

12. The process as defined in claim 1, wherein at least one of said first and second polymeric materials comprises polyolefins having functional monomers chemically attached thereto.

13. The process as defined in claim 12, wherein said functional monomers are chosen from the group consisting of acrylic acid, methacrylic acid, and maleic anhydrides.

14. A process for coating an enclosed structure with a polymeric material, said process comprising the steps of:

securing an enclosed structure to an apparatus adapted to rotate said enclosed structure at least about a first axis, said enclosed structure having an interior surface and an exterior surface;

loading said enclosed structure with a first polymeric material;

rotating said enclosed structure about at least said first axis;

heating said structure during said rotation to a temperature sufficient to melt said first polymeric material for uniformly coating the interior surface of said enclosed structure; and applying a second polymeric material to the exterior surface of said enclosed structure while said structure is rotating about at least said first axis and while said structure is at a temperature sufficient to melt said second polymeric material for coating the exterior surface of said enclosed structure.

15. The process as defined in claim 14, wherein said first polymeric material and said second polymeric material mechanically bond to the surfaces of said enclosed structure and said polymeric materials comprise homopolymers and copolymers of polyolefins.

16. The process as defined in claim 14, further comprising the step of preheating said enclosed structure prior to heating said structure during rotation.

17. The process as defined in claim 14, wherein said enclosed structure is a tank.

18. The process as defined in claim 14, wherein said enclosed structure is a pipe.

19. The process as defined in claim 14, wherein said first and second polymeric materials are applied to said interior and exterior surfaces of said enclosed structure simultaneously.

20. The process as defined in claim 14, wherein said enclosed structure is first heated, said second polymeric material is applied to the exterior surface of said structure and then said structure is loaded with said first polymeric material.

21. A process for internally and externally coating an enclosed structure with a polymeric material, said process comprising the steps of:

connecting an enclosed structure to an apparatus adapted to rotate said enclosed structure about a first axis and a second axis;

placing a polymeric material inside said enclosed structure;

heating said enclosed structure in an oven to a temperature sufficient to melt said polymeric material but at a temperature insufficient to degrade said material;

rotating said enclosed structure about said first axis and said second axis while said structure is in said oven for evenly distributing said melted polymeric material about the interior of said structure;

removing said enclosed structure from said oven while continuously rotating said structure about said first axis; and while said structure is at a temperature above the melting point of said polymeric material, applying additional polymeric material to the exterior of said structure for coating the exterior surface of said structure.

22. The process as defined in claim 21, wherein said polymeric material chemically bonds to said enclosed structure.

* * * * *